(12) United States Patent
Elliott et al.

(10) Patent No.: US 11,691,465 B1
(45) Date of Patent: Jul. 4, 2023

(54) SYSTEM AND METHOD FOR ESTIMATING TIRE LOAD

(71) Applicant: Sensata Technologies, Inc., Attleboro, MA (US)

(72) Inventors: Ian S. Elliott, Antrim (GB); William D. Stewart, Antrim (GB)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 0 days.

(21) Appl. No.: 17/591,986

(22) Filed: Feb. 3, 2022

(51) Int. Cl.
 *B60C 23/06* (2006.01)
 *G01M 17/02* (2006.01)
 *B60C 23/04* (2006.01)

(52) U.S. Cl.
 CPC ........ *B60C 23/064* (2013.01); *B60C 23/0488* (2013.01); *G01M 17/02* (2013.01)

(58) Field of Classification Search
 None
 See application file for complete search history.

(56) References Cited

U.S. PATENT DOCUMENTS

| | | | |
|---|---|---|---|
| 2007/0240501 A1* | 10/2007 | Mancosu | B60C 23/0408 73/146 |
| 2009/0292515 A1* | 11/2009 | Fevrier | G06F 30/20 703/6 |
| 2014/0277926 A1* | 9/2014 | Singh | B60C 23/06 701/34.4 |
| 2014/0278040 A1* | 9/2014 | Singh | G01G 19/086 701/124 |
| 2015/0284006 A1* | 10/2015 | Singh | B60W 40/068 702/41 |
| 2016/0167467 A1* | 6/2016 | Buisson | G06F 30/15 703/2 |
| 2017/0010184 A1* | 1/2017 | Singh | B60C 19/00 |
| 2020/0173872 A1* | 6/2020 | Takedomi | B60C 23/0488 |
| 2021/0101417 A1* | 4/2021 | Kim | G01M 17/02 |
| 2021/0300131 A1* | 9/2021 | Stewart | G01M 17/02 |
| 2021/0302272 A1* | 9/2021 | Wilgar | G01M 17/02 |

* cited by examiner

*Primary Examiner* — Octavia Davis Hollington
*Assistant Examiner* — Jermaine L Jenkins
(74) *Attorney, Agent, or Firm* — Mark H. Whittenberger; Holland & Knight LLP (57) ABSTRACT

Embodiments included herein are directed towards a method for estimating tire load. Embodiments may include determining a tire pressure associated with a tire and determining a tire angular velocity associated with the tire. Embodiments may further include obtaining one or more tire stiffness coefficients and determining a tire radial deformation based upon, at least in part, a length of a tire ground contact patch or a contact patch angle.

20 Claims, 6 Drawing Sheets

SYSTEM AND METHOD FOR ESTIMATING TIRE LOAD

TECHNICAL FIELD

The subject technology relates to tires and sensing techniques that may be used in the analysis of tires.

BACKGROUND

Various approaches exist for estimating tire loading. Generally, to estimate radial tire displacement (i.e., radial deformation at the contact region), performing a 2nd order integration of the acceleration, as measured by a radial accelerometer, allows for such a calculation. However, to achieve the accuracy required, a suitably calibrated and accurate accelerometer would be required to cover a large acceleration range. Such an accelerometer would be expensive and not effective in achieving a low cost solution.

SUMMARY OF THE DISCLOSURE

As will be discussed in greater detail below, embodiments of the present disclosure are directed towards a method for estimating tire load. Embodiments may include determining a tire pressure associated with a tire and determining a tire angular velocity associated with the tire. Embodiments may further include obtaining one or more tire stiffness coefficients and determining a tire radial deformation based upon, at least in part, a length of a tire ground contact patch or a contact patch angle.

One or more of the following features may be included. The tire radial deformation may be based upon, an estimated internal radius. The method may further include estimating tire load based upon the tire pressure, the tire angular velocity, the one or more tire stiffness coefficients, and the tire radial deformation. The tire radial deformation may be determined using any suitable approach, such as: $PRD=R_{free}(1-\cos(\theta/2))$. The tire radial deformation may also be determined using: $PRD=R_{free}(\theta^2/8)$. The method may also include applying a compensation factor to the contact patch angle. The compensation factor may be based upon pressure, velocity, speed, and/or tire stiffness. The method may further include applying a compensation factor to the tire pressure, the tire angular velocity, and/or the one or more tire stiffness coefficients. The method may also include estimating an operating use of the tire. Estimating may include measuring a number of rotations of the tire. Estimating may occur at the tire and/or at the vehicle level. The method may include transmitting the number of rotations via Bluetooth Low Energy ("BLE"). The method may also include monitoring a degree and/or duration of tire deformation during a life of the tire.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

Embodiments of the present disclosure are described with reference to the following figures.

Like reference symbols in the various drawings may indicate like elements.

DETAILED DESCRIPTION

The discussion below is directed to certain implementations. It is to be understood that the discussion below is only for the purpose of enabling a person with ordinary skill in the art to make and use any subject matter defined now or later by the patent "claims" found in any issued patent herein.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered a same object or step.

Figure 1:
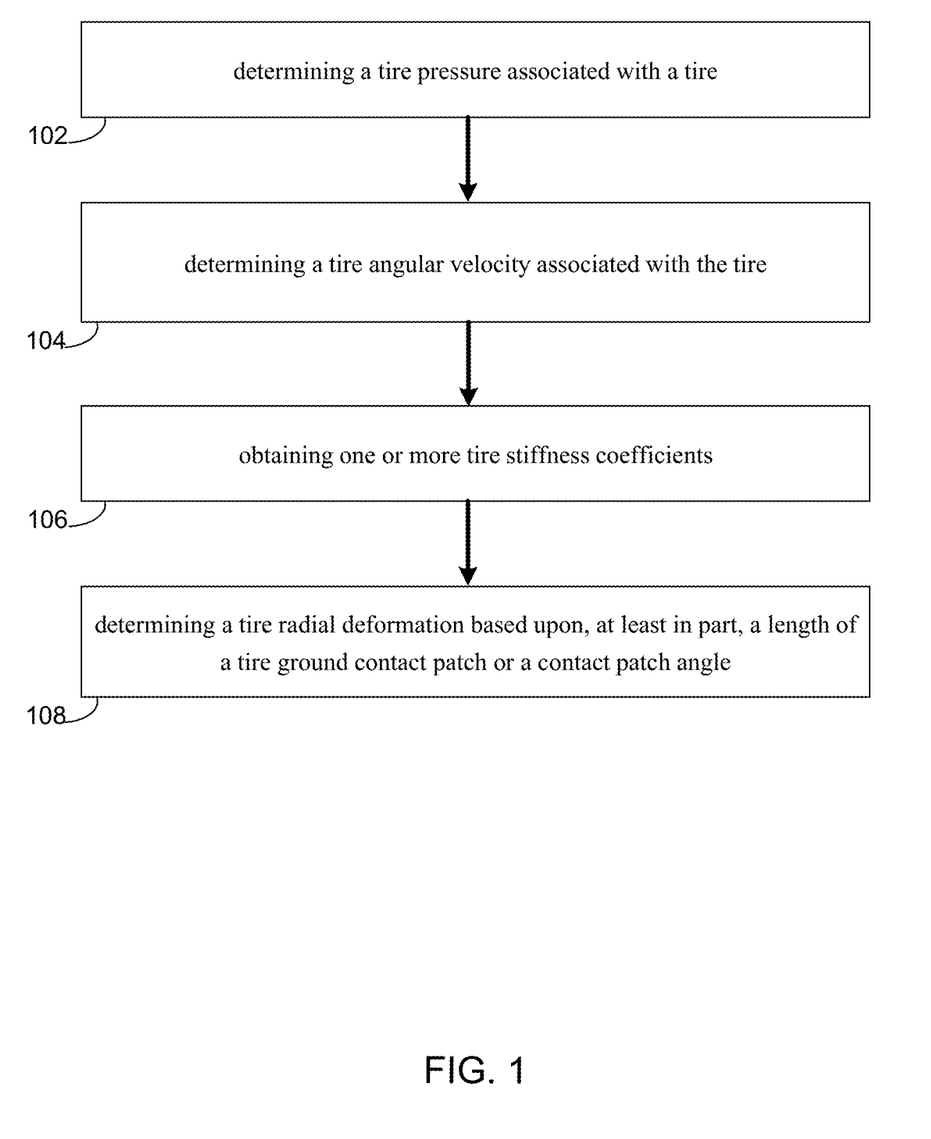
FIG. 1 is a flowchart depicting some operations in accordance with the subject technology.

FIG. 1 shows a flowchart 100 depicting operations for estimating tire load consistent with embodiments of the present disclosure. Embodiments may include determining (102) a tire pressure associated with a tire and determining (104) a tire angular velocity associated with the tire. Embodiments may further include obtaining (106) one or more tire stiffness coefficients and determining (108) a tire radial deformation based upon, at least in part, a length of a tire ground contact patch or a contact patch angle. Each of these will be discussed in further detail hereinbelow. Numerous other operations are also within the scope of the present disclosure.

Using a tire mounted sensor ("TMS"), it is possible to estimate the load subjected on a tire by determining the degree of deformation of the tire in the ground contact region. Embodiments included herein present an approach to estimate tire load while operating under restrictive hardware constraints thereby offering a solution with minimal cost to the end user. Numerous independent compensation methods are described that enhance the accuracy of the tire load estimated value.

There are various approaches to estimate the load subjected on a tire. The majority of such solutions may require input parameters, such as tire pressure, tire deformation via the analysis of radial or tangential acceleration, and/or tire stiffness characteristics. With these methods, in order to estimate a value for load with what would be considered to be an acceptable level of accuracy, accurate and large operating range accelerometers are required, which makes such a solution expensive and suboptimal.

In contrast, embodiments of the present disclosure may be configured to utilize standard, cost effective accelerometers widely used in the tire pressure monitoring industry. These may be contained within a tire mounted sensor module attached to the tire inner liner in the tread region. As a result, the accuracy and operating range is restricted. However, by using unique methods of signal correction it is possible to accurately estimate tire load using a low cost solution.

In some embodiments, a derivative of an algorithm referred to as "The Magic Formula" tire model may be used (see, "*Tire and Vehicle Dynamics*", Third Edition, by Hans P Pacejka). The method of estimating tire load using the magic formula ("MF") requires various inputs. The main parameters required include tire pressure, tire angular velocity, tire stiffness coefficients, and/or tire radial deformation (at the ground contact area).

The parameters of tire pressure and tire angular velocity can be relatively easy to determine. For example, the tire pressure may be obtained via a pressure sensor and the angular velocity may be obtained by measuring the time between ground contact strikes using an accelerometer. These may be contained within the TMS.

In some embodiments, tire stiffness coefficients may be derived by carrying out a simple set of tests well used in the tire industry. These stiffness coefficients are unique to each type of tire and will vary across a broad range of tire sizes, aspect ratios and load and speed rating. It is assumed that wherever the load estimation algorithm resides, in this example the magic formula, it will have access to such stiffness coefficients.

The major input to any algorithm to determine tire load is the degree of tire deformation at the ground contact region. In the case of the MF, the measurement of peak radial displacement is required. It is standard practice to measure precise acceleration to provide a value for displacement. In the case of determining radial tire displacement (radial deformation at the contact region), performing a $2^{nd}$ order integration of the acceleration measured by a radial accelerometer would enable such a result. However, to achieve the accuracy required, a suitably calibrated and accurate accelerometer would be required to cover a large acceleration range. Such an accelerometer would be expensive and not effective in achieving a low cost solution. So, another method to estimate the tire's peak radial displacement is required while operating under the constraints that accurate radial acceleration is not achievable.

The degree of tire deformation can also be determined in estimating the length of the tire's ground contact patch or the contact patch angle ("CPA"). By geometrical means, it is possible to infer an estimation for the peak radial displacement.

Figure 2:
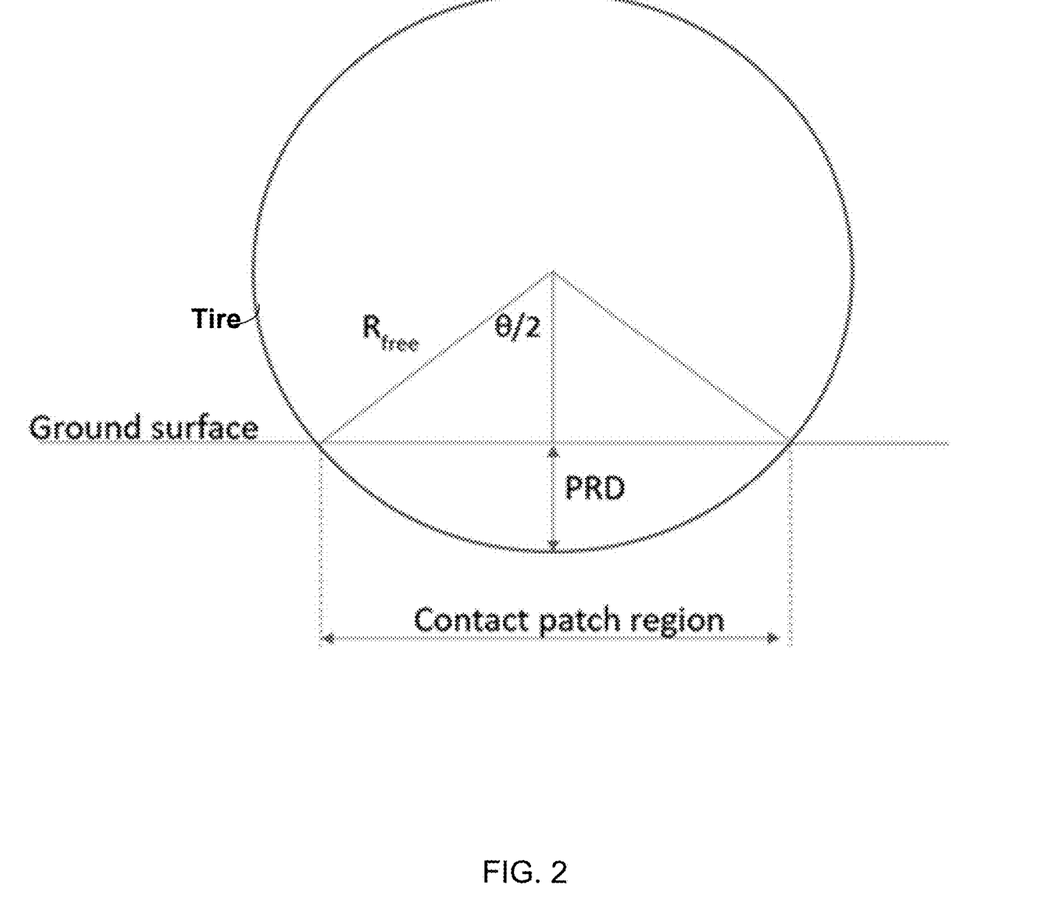
FIG. 2 is a diagram showing a tire and associated ground surface in accordance with the subject technology.

Referring now to FIG. 2, a diagram showing a tire and its relationship to the ground is provided. As shown in FIG. 2, the CPA of the tire that is in the deformation zone may be denoted by θ. Accordingly, the angle from the peak radial position to the outer periphery may be denoted by θ/2. Using basic trigonometry, a value may be estimated for peak radial displacement ("PRD"). Where, $$PRD = R_{free}(1 - \cos(\theta/2))$$

$R_{free}$ is the estimated internal radius and may be derived using the magic formula and stiffness coefficients derived at the time of tire characterization. The equation above may be further streamlined for simple computational processing purposes using a series expansion for cosine to:

$$PRD = R_{free}(\theta^2/8)$$

The value of $R_{free}$ may be measured on the sensor. However, in alternative embodiments $R_{free}$ may be calculated on the vehicle by either using the TMS measured rotational velocity (if this were transmitted to the vehicle) and/or by using the ABS ring to determine rotational velocity.

In some embodiments, the contact patch region, contact patch angle and/or the PRD—may also be determined in the sensor. Additionally and/or alternatively, the acc signal could be transmitted in whole or in part to the vehicle and the contact patch region/CPA and PRD could be calculated on the vehicle. In some embodiments, if calculating the above on the vehicle the rotational velocity (OMEGA) may be obtained from the TMS by way of transmitting it to the vehicle and/or the ABS ring could provide this information.

However, this method to derive PRD via CPA may require compensation as the value of CPA estimated is not the true value of CPA required to map to the peak radial displacement that has been measured during characterization. This may be due to the concertinaed effect of the tire as it enters and exits the contact patch, and the challenges of identifying the exact location where the tire enters and exits the contact patch region. Accordingly, a factor of compensation may be applied to create the accurate mapping of the estimated CPA to the true value of CPA required to accurately infer the magnitude of the peak radial deformation. Such a compensation factor may be applied to the contact patch angle itself or to any parameter or output from the MF or any other algorithm used to estimate tire load. Additionally, such compensation may be based on at least one of the list of parameters comprising of pressure, velocity, speed, tire stiffness. Accordingly, embodiments included herein present a solution and compensation method to estimate tire load using a cost effective minimal design.

Figure 3:
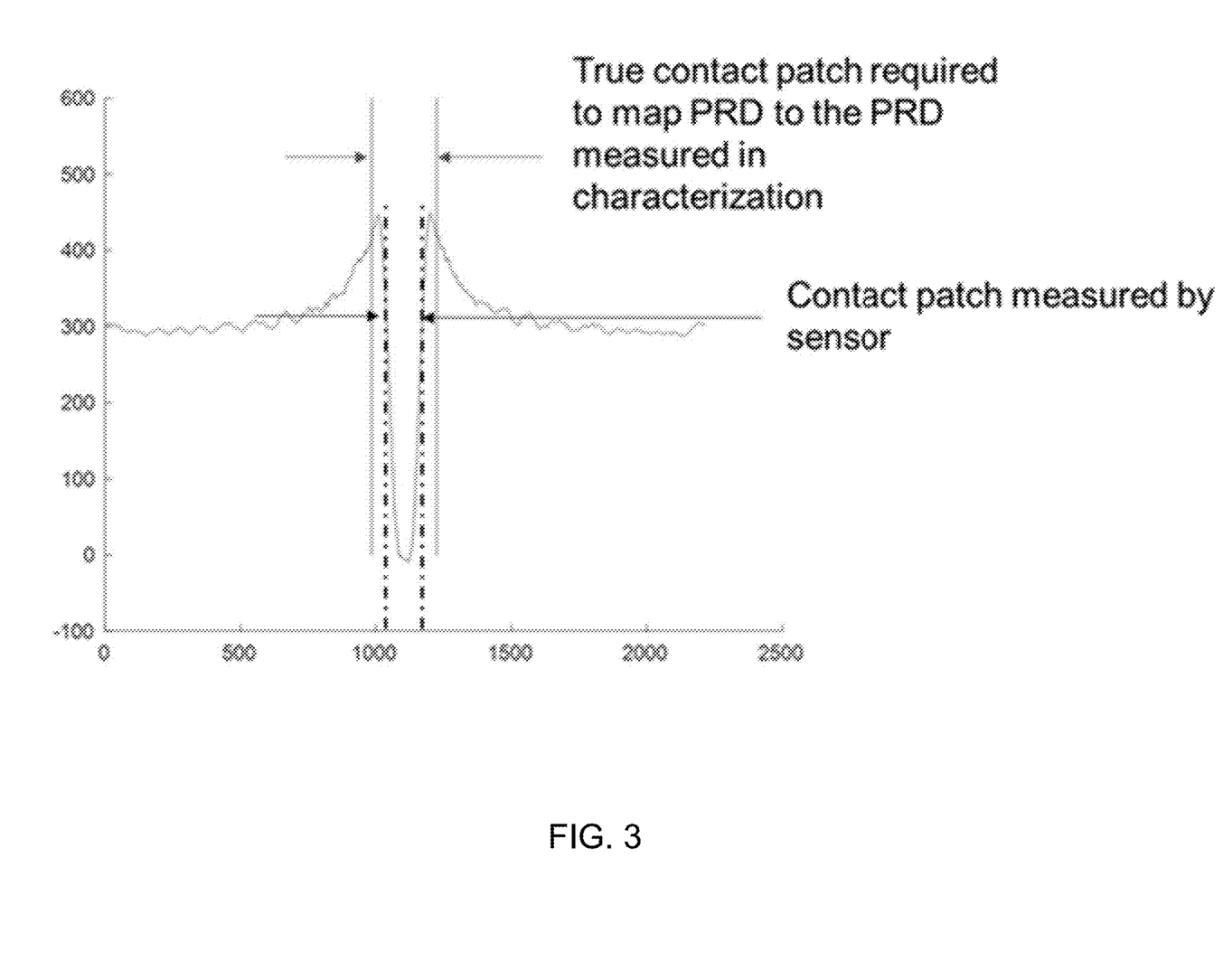
FIG. 3 is a plot showing contact patch measurements in accordance with the subject technology.
Figure 4:
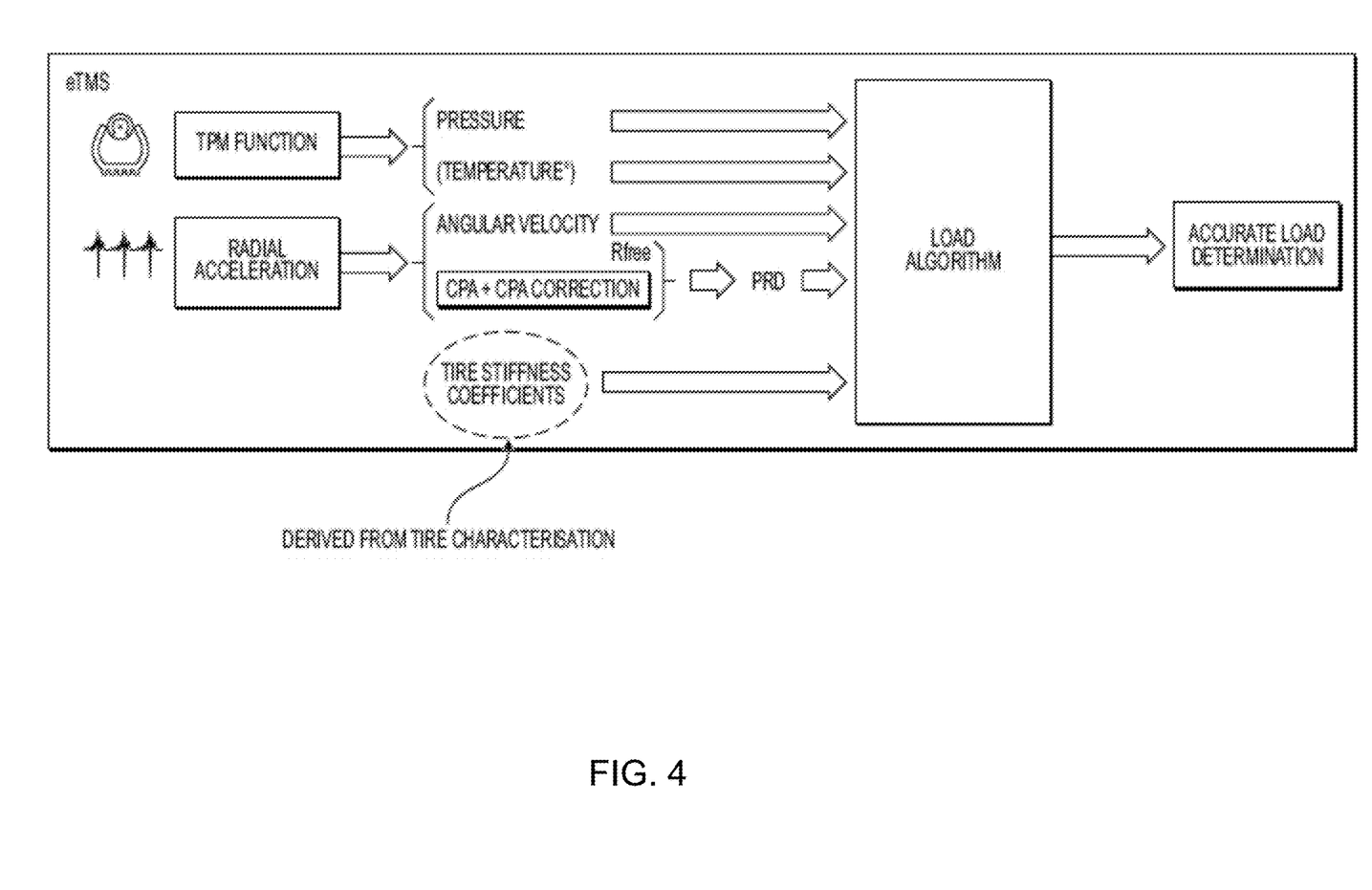
FIG. 4 is a diagram consistent with embodiments of the subject technology.
Figure 5:
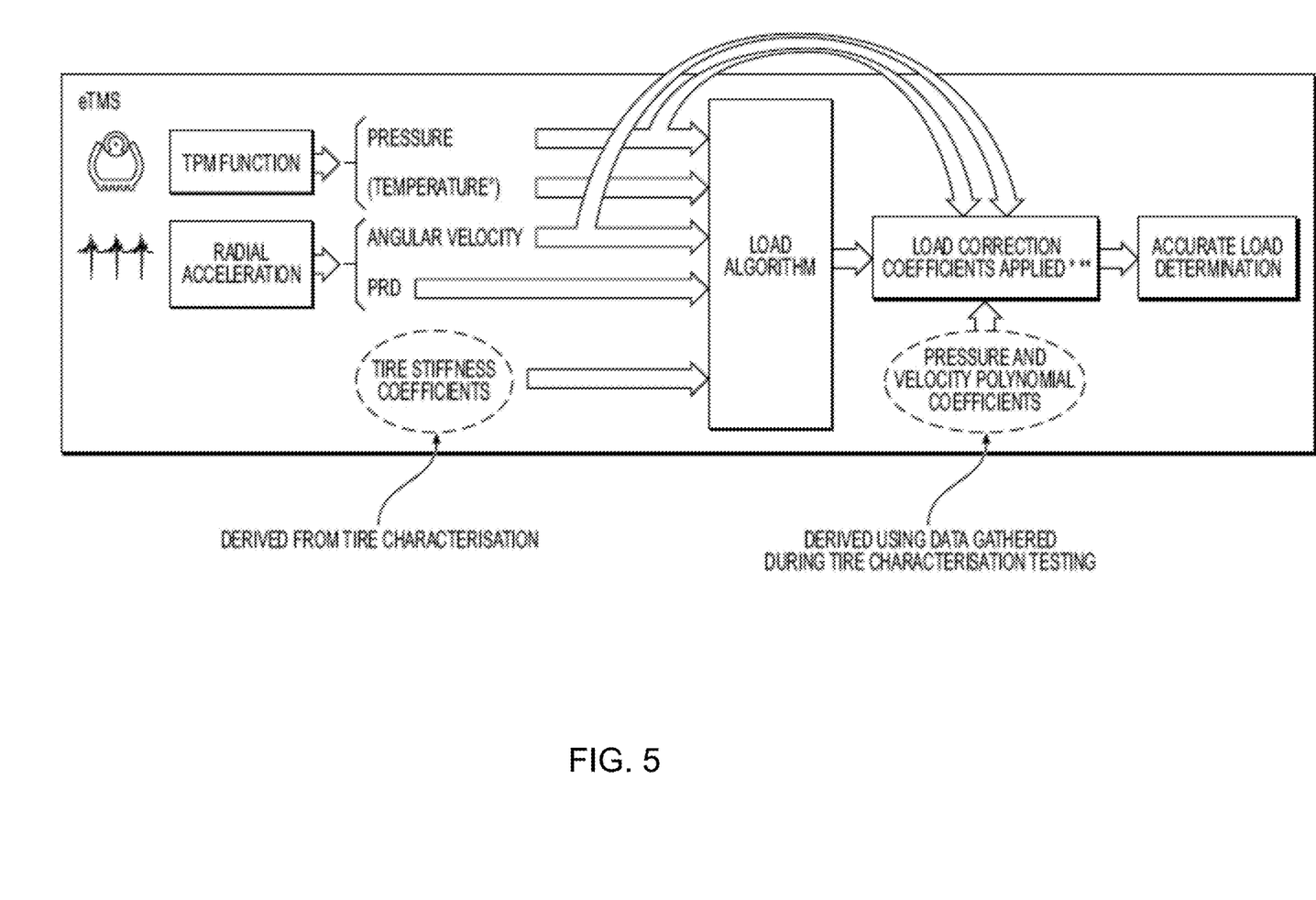
FIG. 5 is a diagram consistent with embodiments of the subject technology.

Referring now to FIG. 3, a plot illustrating the requirement for the contact patch adjustment is provided. FIG. 3 shows a comparison of the contact patch as measured by the sensor compared with the true contact patch required. The compensation may be applied as provided in FIG. 4 or the correction may occur at the output of the magic formula discussed above as shown in FIG. 5.

Figure 6:
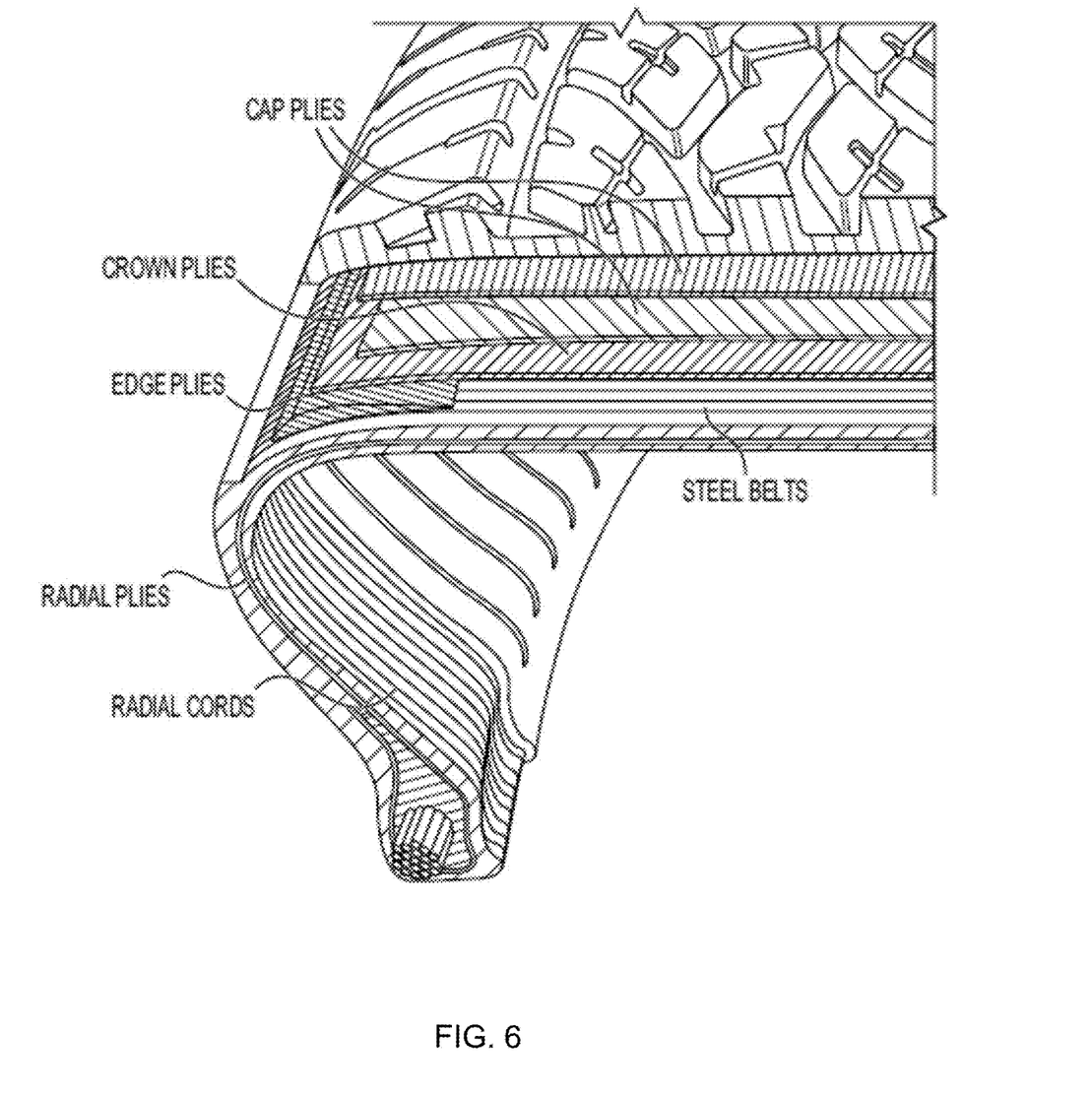
FIG. 6 is a schematic sectional view of a tire in accordance with the subject technology.

In some embodiments, and as described in further detail below with reference to FIG. 6, an additional compensation approach to optimize the accuracy of the load estimation over the life of the tire is provided. Relaxation of the bonding between radial plies and radial cords, caused by everyday use, leads to tire stiffness changes over the life of the tire—compensating for miles traveled/rotations completed could be applied to offset the natural stiffness change. As previously described, the load tire subjected on a tire may be derived by measuring or estimating the degree of deformation at the ground contact patch region. This deformation presents as a radial deformation or a contact patch length/angle with the ground surface.

While a tire is in operation, it is subjected to a continuous deformation over the entirety of its circumference. This continuous deformation results in the settling/changing of the fibrous structure within the tire. The change of the structure of the tire and tread block depletion causes a change to the stiffness of the tire and thereby the accuracy of the derived stiffness coefficients.

As a consequence of prolonged and continuous flexing and stressing of the tire, its structural stiffness will change and the estimated load value will become less accurate over the period of tire use when compared to a new tire scenario. A tire use compensation factor may be applied to avoid such a situation.

In some embodiments, the tire load estimation process described herein may be configured to gauge the extent of use of a tire by estimating/logging the number of revolutions that it has been subjected to. This may be enabled by either estimating the number of revolutions travelled at the TMS itself or at a vehicle level and periodically transmitting the value for revolutions/distance travelled to the TMS via BLE, for example. Additionally, with a TMS it may be possible to enhance this estimation of tire use by monitoring the degree and duration of tire deformation during its operating life. This extent of deformation would be subject to inflation pressure and tire loading conditions. Using this information relating to duration of tire operation and the degree of stress subjected on the tire, a compensation factor is applied to the estimated load value based on the operating use of the tire.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A method for estimating tire load comprising:
   determining a tire pressure associated with a tire;
   determining a tire angular velocity associated with the tire;
   obtaining one or more tire stiffness coefficients; and
   determining a tire radial deformation based upon, at least in part, a length of a tire ground contact patch or a contact patch angle.

2. The method according to claim 1, wherein the tire radial deformation is based upon, an estimated internal radius.

3. The method according to claim 1, further comprising:
   estimating tire load based upon the tire pressure, the tire angular velocity, the one or more tire stiffness coefficients, and the tire radial deformation.

4. The method according to claim 1, wherein the tire radial deformation is determined using:

$PRD = R_{free}(1 - \cos(\theta/2))$

5. The method according to claim 1, wherein the tire radial deformation is determined using:

$PRD = R_{free}(\theta^2/8)$

6. The method according to claim 1, further comprising:
   applying a compensation factor to the contact patch angle.

7. The method according to claim 6, wherein the compensation factor is based upon pressure.

8. The method according to claim 6, wherein the compensation factor is based upon velocity.

9. The method according to claim 6, wherein the compensation factor is based upon speed.

10. The method according to claim 6, wherein the compensation factor is based upon tire stiffness.

11. The method according to claim 1, further comprising:
    applying a compensation factor to the tire pressure.

12. The method according to claim 1, claim 1, further comprising:
    applying a compensation factor to the tire angular velocity.

13. The method according to claim 1, further comprising:
applying a compensation factor to the one or more tire stiffness coefficients.

14. The method according to claim 1, further comprising:
estimating an operating use of the tire.

15. The method according to claim 14, wherein estimating includes measuring a number of rotations of the tire.

16. The method according to claim 15, wherein estimating occurs at the tire.

17. The method according to claim 15, wherein estimating occurs at the vehicle level.

18. The method according to claim 17, further comprising:
transmitting the number of rotations via Bluetooth Low Energy ("BLE").

19. The method according to claim 1, further comprising:
monitoring a degree of tire deformation during a life of the tire.

20. The method according to claim 1, further comprising:
monitoring a duration of tire deformation during a life of the tire.

\* \* \* \* \*